US011829280B1

(12) United States Patent
Zhang et al.

(10) Patent No.: US 11,829,280 B1
(45) Date of Patent: Nov. 28, 2023

(54) AUTOMATIC TEST CASE GENERATION AND EXECUTION FOR CONTAINERIZATION WORKFLOWS

(71) Applicant: Amazon Technologies, Inc., Seattle, WA (US)

(72) Inventors: Jiangtao Zhang, Pleasanton, CA (US); Boyu Wang, Santa Clara, CA (US); Peter Aydin Sorensen, Antelope, CA (US)

(73) Assignee: Amazon Technologies, Inc., Seattle, WA (US)

( * ) Notice: Subject to any disclaimer, the term of this patent is extended or adjusted under 35 U.S.C. 154(b) by 97 days.

(21) Appl. No.: 16/995,545

(22) Filed: Aug. 17, 2020

(51) Int. Cl.
*G06F 11/36* (2006.01)

(52) U.S. Cl.
CPC ........ *G06F 11/368* (2013.01); *G06F 11/3684* (2013.01); *G06F 11/3688* (2013.01); *G06F 11/3692* (2013.01)

(58) Field of Classification Search
CPC ............... G06F 11/368; G06F 11/3684; G06F 11/3688; G06F 11/3692
See application file for complete search history.

(56) References Cited

U.S. PATENT DOCUMENTS

| 9,483,387 B1* | 11/2016 | Allocca | G06F 11/3684 |
| 9,753,841 B1* | 9/2017 | Shen | G06F 11/3684 |
| 2003/0182408 A1* | 9/2003 | Hu | H04L 41/0896 |
| | | | 714/E11.193 |

(Continued)

OTHER PUBLICATIONS

Somya Garg et al., "Automated Cloud Infrastructure, Continuous Integration and Continuous Delivery using Docker with Robust Container Security," 2019 [retrieved Mar. 12, 2022], 2019 IEEE Conference on Multimedia Information Processing and Retrieval, pp. 467-470, downloaded from https://ieeexplore.ieee.org. (Year: 2019).*

(Continued)

*Primary Examiner* — S. Sough
*Assistant Examiner* — Stephen D Berman
(74) *Attorney, Agent, or Firm* — NICHOLSON DE VOS WESBSTER & ELLIOTT LLP

(57) ABSTRACT

Techniques are described for enabling a software modernization application to automatically generate and execute test cases as part of a containerization workflow used to modernize various types of legacy software applications. A software modernization application enables a user to identify a legacy application to convert into a containerized application. Once identified, the software modernization application automatically packages application artifacts and identified dependencies into container images and creates a deployment pipeline used to deploy the containerized application into testing and production environments of a service provider network, among other processes. The software modernization application also instruments the legacy application to generate log data reflecting requests and responses received and processed by the application during operation. This instrumentation data can be used in some embodiments to automatically generate test cases used to test a containerized version of the software application to ensure that the application continues to operate as expected.

20 Claims, 8 Drawing Sheets

(56) References Cited

U.S. PATENT DOCUMENTS

| | | | | |
|---|---|---|---|---|
| 2016/0283348 A1* | 9/2016 | Golde | ................ | G06F 11/3664 |
| 2017/0315795 A1* | 11/2017 | Keller | ................ | G06F 11/3006 |
| 2019/0108116 A1* | 4/2019 | Benes | ................... | G06F 21/552 |
| 2019/0114251 A1* | 4/2019 | Sapozhnikov | .......... | H04L 43/55 |
| 2019/0188119 A1* | 6/2019 | Kumarath | ........... | G06F 11/3688 |
| 2020/0329098 A1* | 10/2020 | Boddam | ............. | G06F 11/3692 |

OTHER PUBLICATIONS

Muhammet Ozcan et al., "Remote Debugging for Containerized Applications in Edge Computing Environments," 2019 [retrieved Mar. 12, 2022], 2019 IEEE International Conference on Edge Computing, pp. 30-32, downloaded from https://ieeexplore.ieee.org. (Year: 2019).*

Toni Lammi, "Feasibility of Application Containers in Embedded Real-Time Linux," 2018 [retrieved on Feb. 11, 2023], pp. 1-60, downloaded from <url>:https://trepo.tuni.fi/bitstream/handle/123456789/26500/lammi.pdf?sequence=4. (Year: 2018).*

Emily Le et al., "Performance Analysis of Applications using Singularity Container on SDSC Comet," 2017 [retrieved on Feb. 11, 2023], Proceedings of the Practice and Experience in Advanced Research Computing 2017 on Sustainability, Success and Impact, pp. 1-4, downloaded from <url>:https://dl.acm.org. (Year: 2017).*

Precub, Adrian, "Guide to Java Instrumentation", Baeldung, Available Online at <https://www.baeldung.com/java-instrumentation>, Dec. 31, 2019, 10 pages.

Wikipedia, "Instrumentation (computer programming)", Available Online at <https://en.wikipedia.org/wiki/Instrumentation_(computer_programming)>, Mar. 3, 2020, 2 pages.

* cited by examiner

AUTOMATIC TEST CASE GENERATION AND EXECUTION FOR CONTAINERIZATION WORKFLOWS

BACKGROUND

Software modernization techniques are widely used by business organizations and other entities desiring to improve their information technology (IT) environments in response to changing software application use cases, resource demands, and user access patterns. For example, while many legacy applications were designed for older operating environments with lesser resources and expectations, modern applications now often need the ability to scale quickly to potentially millions of users, have global availability, manage very large amounts of data, and respond to requests in milliseconds. The various processes for upgrading, converting, and rewriting such applications to enable improved performance is referred to generally as "software modernization." Software application and software-based system modernization can include, for example, porting legacy applications or systems to modern computer programming languages or application frameworks, updating software libraries, protocols, or hardware platforms, and the like. For organizations desiring to make use of cloud provider network resources, the modernization process can further include migrating resources from an organization's on-premises environment to a cloud provider network, modernizing an application's architecture with containers, serverless functions, and other more scalable architecture tools provided by cloud provider networks.

BRIEF DESCRIPTION OF DRAWINGS

Various embodiments in accordance with the present disclosure will be described with reference to the drawings, in which.

DETAILED DESCRIPTION

Figure 1:
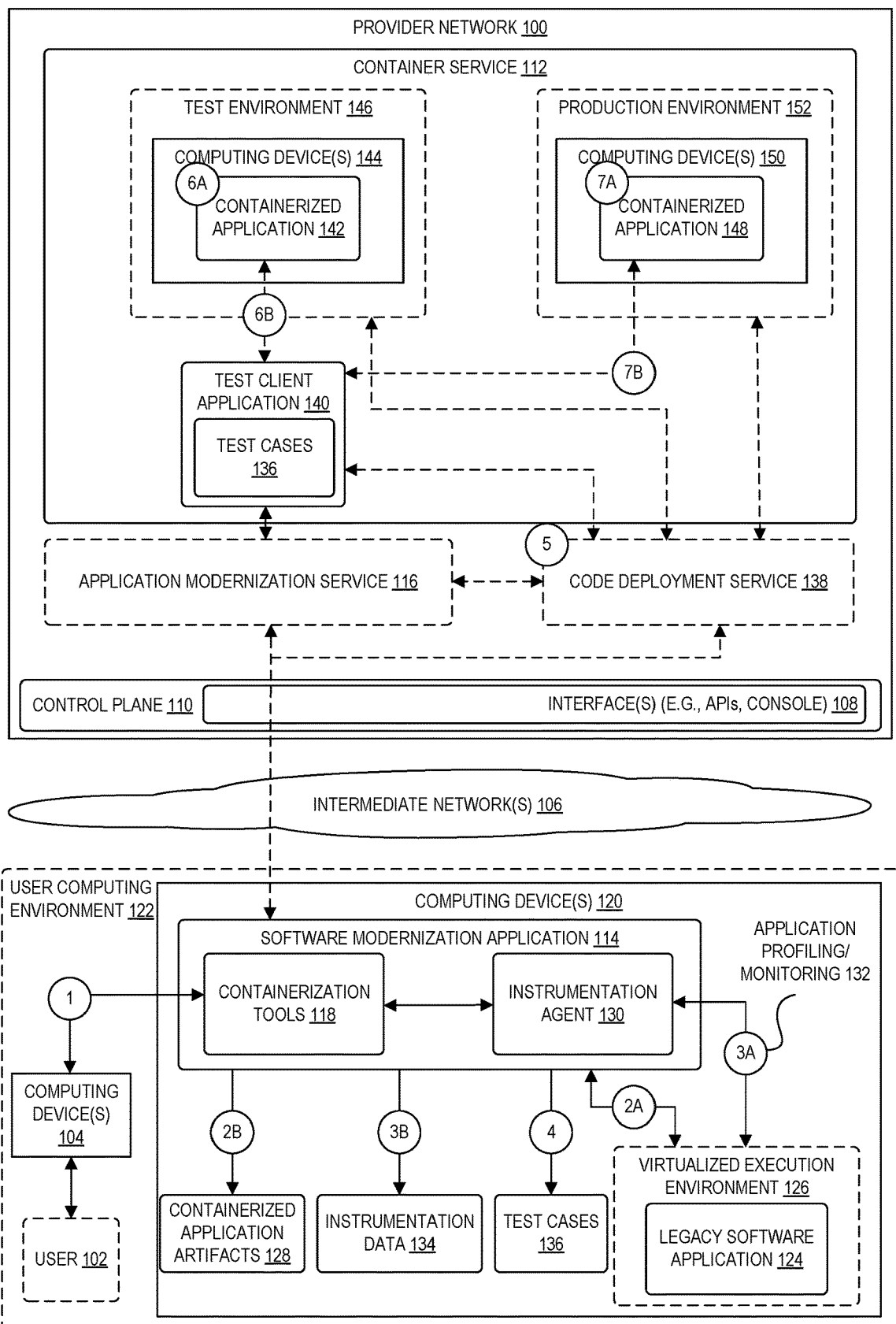
FIG. 1 is a diagram illustrating an environment for automating test case generation and execution as part of a software application containerization workflow according to some embodiments.

The present disclosure relates to methods, apparatus, systems, and non-transitory computer-readable storage media for enabling a software modernization application to automatically generate and execute test cases as part of a containerization workflow used to modernize various types of legacy software applications. According to some embodiments, a software modernization application enables a user to identify a legacy application that the user desires to convert into a containerized application. Once identified, the software modernization application automatically packages application artifacts and identified dependencies into container images, configures network ports, etc., and creates a deployment pipeline used to deploy the containerized application into testing and production environments of a service provider network, among other possible processes. In some embodiments, the software modernization application also instruments the legacy application to generate log data reflecting requests and responses (e.g., application programming interface (API) requests and responses) received and processed by the application during operation. This instrumentation data can be used in some embodiments to automatically generate test cases used to test a containerized version of the software application to ensure that the application continues to operate as expected. Among other benefits, the automatic generation and execution of test cases as part of a containerization workflow significantly improves users' ability to containerize legacy applications and to ensure the proper functioning of such containerized applications, thereby improving application performance and the use of computing resources supporting execution of such applications.

Software modernization broadly refers to converting, rewriting, or porting legacy software applications or systems to more modern computer programming languages, software libraries, protocols, hardware platform, application architectures, cloud-based services, among other possible modernization tools. Users, business organizations, and other entities may often desire to modernize their various software applications and systems to improve operational performance and increase application availability, to reduce exposure to vulnerabilities (e.g., software crashes, security vulnerabilities, etc.), to migrate applications from on-premises environments to infrastructure provided by a cloud services provider, and to enable more efficient ongoing development of the applications, among many other possible reasons.

Many computing environments today still include large numbers of legacy software applications developed and maintained over the past decades. These legacy applications typically are built, configured, and deployed within such computing environments using processes that are largely manual and tailored to each individual application. The maintenance and scaling of such applications thus often involves a significant amount of effort on the part of information technology (IT) support teams and hinders software development teams' abilities to further develop the applications and to develop new tools and services. For these reasons and others, many IT teams are turning to software modernization techniques and, in particular, to the use of containers to better manage their applications and application deployments.

A container represents a logical packaging of a software application that abstracts the application from the computing environment in which the application is executed. For example, a containerized version of a software application includes the software code and any dependencies used by the code such that the application can be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, other configurations) used to enable the application to run in a container engine.

According to embodiments described herein, a cloud provider network provides application modernization software that helps users to containerize legacy software applications and to deploy containerized applications into the cloud provider network or other execution environments. In some embodiments, containerization tools of the provided application modernization software can be used to identify an inventory of candidate applications within a user's computing environment for containerization, to analyze identified applications for dependencies and other application characteristics needed to run the application(s) in containers, to generate container images and other container artifacts based on the application analysis, and to deploy the generate containers to container execution environments, among other features. In some embodiments, the containerization tools are implemented as a standalone software application that can be readily installed in a user's IT environment to perform the operations described above, and the application may further coordinate various tasks with one or more services of the cloud provider network (including, e.g., a software modernization service, a container service, a container registry service, a code deployment service, etc.).

Once a user has used the containerization tools to containerize a software application, the user typically desires to validate whether the containerized version of the application works as expected (e.g., that a deployed container of the application works in the same manner as the non-containerized version of the application). In existing computing environments, users may thus manually create and execute test cases in an attempt to assess the application's performance in its containerized form. If one or more of the user's test cases fails, the user may modify the containerization configurations, re-perform the containerization process, and re-execute the test cases until the containerized version successfully passes the test cases. Once a user has successfully validated and deployed a containerized application, the user typically continues to maintain and possibly further develop the application along with other development team members (e.g., in a process sometimes referred to as continuous integration and continuous deployment, or CI/CD). Once a new version of the application is created and containerized, the users may again manually run test cases to ensure that the updated version of the containerized application continues to operate as expected. The maintenance and repetition of such testing procedures each time an application is containerized or updated and deployed is often challenging for users to perform in a consistent manner and thus remains a burdensome and error prone process.

The aforementioned challenges, among others, are addressed by the software modernization application and containerization tools described herein which automatically generate and execute test cases as part of a containerization workflow. According to embodiments, the containerization tools described herein are configured, among other processes, to instrument a legacy software application to be containerized to generate instrumentation data profiling the operation of the application (e.g., including log data indicating types of requests received by the application and responses generated). The containerization tools are further configured to automatically generate test case artifacts along with the generated container artifacts (e.g., test case artifacts describing types of tests to be performed based on analysis of the types of requests and responses identified in the instrumentation data). In some embodiments, these automatically generated test cases can be executed by a test case execution engine as an automated part of a deployment pipeline or workflow. The automated generation and execution of test cases in this manner alleviates a significant burden in the containerization process, thereby enabling more efficient software application development, application deployment, and use of computing resources supporting the resulting containers.

FIG. 1 is an environment for automating test case generation and execution as part of a software application containerization workflow. A cloud provider network 100 (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The users (or "customers") of provider networks 100 may utilize one or more user accounts that are associated with a customer account, though these terms may be used somewhat interchangeably depending upon the context of use. Users (e.g., a user 102) may use various types of computing devices (e.g., a computing device 104) to interact with a provider network 100 across one or more intermediate networks 106 (e.g., the internet) via one or more interface(s) 108, such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) 108 may be part of, or serve as a front-end to, a control plane 110 of the provider network 100 that includes "backend" services supporting and enabling the services that may be more directly offered to customers.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to AZs of the cloud provider network via a publicly accessible network (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute resources (e.g., a "compute instance" such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly utilize a compute resource (e.g., provided by a hardware virtualization service) hosted by the provider network to perform a variety of computing tasks. Additionally, or alternatively, a user may indirectly utilize a compute resource by submitting code to be executed by the provider network (e.g., via an on-demand code execution service), which in turn utilizes one or more compute resources to execute the code—typically without the user having any control of or knowledge of the underlying compute instance(s) involved.

A hardware virtualization service, for example, (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which may run at least on an offload card of the server (e.g., a card connected via PCI or PCIe to the physical CPUs and other components of the virtualization host may be used for some virtualization management components. Such an offload card of the host can include one or more CPUs that are not available to customer instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

The container service 112 can be a container orchestration and management service (referred to in various implementations as a container service, cloud container service, container engine, or container cloud service) that allows users of the cloud provider network to instantiate and manage containers. In some embodiments the container service 112 may be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container platforms) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example, by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

In some embodiments, among other features, a software modernization application 114 (e.g., the AWS App2Container (A2C) tool provided by Amazon Web Services (AWS®)) and, optionally, an application modernization service 116 collectively provide a framework for users to iterate over containerization workflows for their applications. These containerization workflows, for example, may be managed by various containerization tools 118 implemented as part of the software modernization application 114. For example, in FIG. 1, a user 102 has installed the software modernization application 114, including the containerization tools 118, on a computing device 120 within the user's computing environment 122 (e.g., an on-premises datacenter or other type of computing environment) to assist with modernizing a legacy software application 124 running in the user's computing environment 122. The legacy software application 124, for example, may include one or more Java® applications deployed on a Linux®-based or Windows®-based host and generally represents any type of software executing in a computing environment (e.g., software implementing a web application or service, business application software, etc.). The legacy software application 124 may be a single process or a group of interoperating processes that are identified by the users (e.g., via a process identifier or process command line) and may execute within a virtualized execution environment 126 (e.g., the Java® virtual machine (JVM) in the case of a Java application, or any other execution environment for other types of applications). In some embodiments, the software modernization application 114 automatically identifies one or more groups of interoperating processes associated with a legacy application 124 for the user.

In some embodiments, users (e.g., a user 102) can use a computing device 104 to interact with the software modernization application 114 via a command line interface (CLI) (e.g., a CLI associated with the App2Container tool provided by AWS®), graphical user interface (GUI), or other type of interface. As indicated above, a user might desire to use the software modernization application 114 to containerize a legacy software application in the user's computing environment to take advantage of the performance and scalability improvements provided by containers. To start the containerization process, in some embodiments, a user invokes an "inventory" command provided by the software modernization application 114 to identify applications within the user's operating environment 122 that can be containerized (e.g., including legacy software application 124 in the example of FIG. 1). Once a candidate application is identified, the containerization tools 118 may further generate data providing basic details about the identified application(s) such as an application name, process identifier, application path, application type, and the like.

In some embodiments, once an application of interest for containerization is identified based on the inventory process described above, the user can then execute an "analyze" command on the identified application (e.g., using an application identifier generated in the "discovery" stage). In some embodiments, responsive to an analyze command, the containerization tools 118 analyze the identified application and generate a file containing analysis results. The analysis results may include, for example, various containerization parameters (e.g., an image repository, an image tag, a base image, etc.) and other information (e.g., an operating system type associated with the application, an operating system version, process identifier, application type, etc.). In some embodiments, the containerization tools 118 use the information contained in the analysis file to generate a container image and associated artifacts for the application. In some embodiments, the analysis file is editable, and a user can modify containerization configurations contained in the analysis file and elsewhere, where such configurations are used by various containerization processes performed by the software modernization application 114.

In some embodiments, the containerization tools 118 can also be used to automate the process of deploying a containerized application to a container service 112 of a cloud provider network 100 or other execution environment. In some embodiments, the containerization tools 118 can also be used to store a generated container image in a container registry service of the cloud provider network 100, where the container image can be managed and deployed within the cloud provider network. In some embodiments, the ability for the containerization tool 118 to deploy and store container images at various services of the cloud provider network 100 is based in part on user account credentials provided to the application by the user 102. Once deployed to the container service 112 or other execution environment, the containerized version of the application can be used in much the same manner as the local legacy software application 124.

As indicated above, users may often desire to perform various tests during a containerization workflow such as described above to ensure that a containerized version of an application operates as expected (e.g., in a manner similar to that of the original legacy application). In FIG. 1, the numbered circles labeled "1"-"7" illustrate an example process that includes a software modernization application 114 assisting users with the containerization of a legacy software application 124, as described above, and further automatically generating and executing test cases to ensure that a containerized version of the application operates as expected.

In some embodiments, at circle "1" in FIG. 1, a user 102 uses a computing device 104 to interact with the software modernization application 114 and to initiate a containerization workflow. As described above, the user 102 can use the containerization tools 118 to create an inventory of candidate applications for containerization in the user's operating environment 122, select a particular application to be containerized, and to configure and carry out the containerization and deployment of a containerized version of the application. In the example of FIG. 1, the user 102 provides input indicating a desires to containerize the legacy software application 124, e.g., by selecting the application from a generated inventory of applications or otherwise identifying a location of the application in the user computing environment 122.

In some embodiments, responsive to the user input identifying the legacy software application 124 for containerization, at circle "2A," the software modernization application 114 analyzes the legacy software application 124 to generate, at circle "2B," containerized application artifacts 128. As indicated above, the containerized application artifacts 128 can include a container image, container engine files, task definitions, and the like. In some embodiments, at circle "3A," the software modernization application 100 further uses an instrumentation agent 130 or other component to profile and monitor execution of the legacy software application 124 (e.g., application profile/monitoring 132) to generate, at circle "3B," instrumentation data 134 to be used to automatically generate test cases, as described in more detail below.

Figure 2:
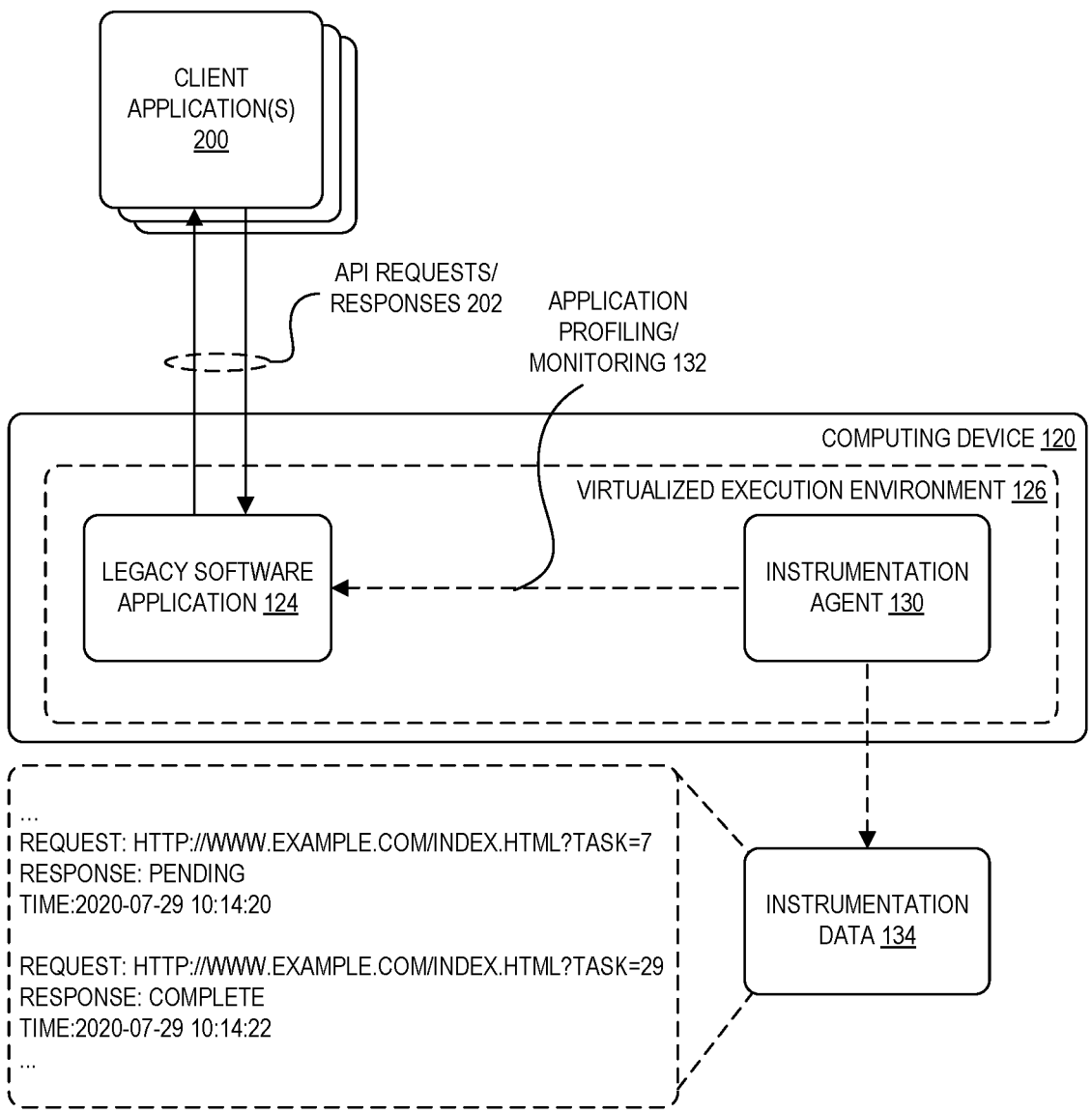
FIG. 2 is a diagram illustrating the instrumentation of a legacy software application to obtain instrumentation data used to automatically generate test cases according to some embodiments.

FIG. 2 is a diagram illustrating the instrumentation of a legacy software application according to some embodiments. In some embodiments, the instrumentation of the legacy software application 124 is performed by an instrumentation agent 130 that can be installed on the computing device 120 upon which the legacy software application 124 is executing. In some embodiments, the instrumentation agent 130 monitors and generates log data reflecting the operation of the legacy software application 124 during execution, where the log data records information about requests and responses 202 received and sent by the legacy software application 124 responsive to interactions with client application(s) 200. In some embodiments, if the legacy software application 124 is a Java® application, the instrumentation agent 130 may include a Java-based agent that interfaces with the legacy software application 124 via the Java® virtual machine (JVM). In this example, the instrumentation agent 130 may be implemented as a Java® ARchive (JAR) file that utilizes an instrumentation API provided by the Java® framework to monitor requests and responses processed by the legacy software application 124 during operation. In some embodiments, if the legacy application is implemented using other programming languages or frameworks, other types of agents can be used to monitor requests and responses communicated between the legacy software application 124 and client application(s) 200 (e.g., agents that can interface with other execution environments or monitor network traffic communicated between the applications, etc.)

As indicated above, in some embodiments, the instrumentation agent 134 generates instrumentation data 134 (e.g., as a file or other type data store) to log the requests and responses 202 generated and sent by the legacy application over time. As shown in FIG. 2, the instrumentation data 134 may include log data where each entry indicates a type of request received and including request parameters, information indicating a response value returned by the legacy software application 124, and a time at which the request was processed, and the like. The instrumentation data 134 shown in FIG. 2 is provided for illustrative purposes only; in other examples, the instrumentation data 134 may include additional information such as, for example, field-value pairs included requests, field-value pairs included in application responses, a processing time associated with each request, an amount of data transferred, types of data transferred, or any other associated information.

In some embodiments, a user may not allow or may not be permitted to install an instrumentation agent 130 on a same computing device 120 as that upon which the legacy software application 124 executes. In this scenario, in some embodiments, a containerized version of the legacy software application 124 can be installed in a "sandbox" environment and the user can manually run test cases against the containerized version of the application. The instrumentation agent 130 or containerization tool 118 can monitor and log the execution of the manually run test cases, where this log information can be used to generate automated test cases to be used in the future, as described in more detail hereinafter.

Returning to FIG. 1, in some embodiments, the containerization tools 118 optionally perform tests on the containerized application artifacts 128 to ensure that the containerization processes were performed successfully. For example, the output of the containerization process may include an application archive (e.g., a tar or zip file), a Dockerfile, an entryfile, an application template (e.g., a JSON-formatted file), and one or more Docker® images, and the containerization tools 118 may confirm that each of the artifacts was successfully generated as part of the containerization processes. The containerization tools 118 may also send various metrics resulting from the containerization process to the cloud provider network (e.g., to a software modernization service 116 or another location associated with a service account).

In some embodiments, the containerization tools 118 also generates, at circle "4," one or more test cases 136 based on the instrumentation data 134 obtained by the instrumentation agent 130. In some embodiments, the generation of the test cases includes analyzing the instrumentation data 134 to identify types of requests received by the legacy software application 124 and the types of responses sent by the legacy software application 124 back to requesting clients. For example, if the legacy software application 124 is a web-based service, the instrumentation data may include log information detailing API requests received by the application (e.g., including request methods and parameters) and the types of responses sent by the legacy application based on processing the requests (e.g., including response parameters or other data). The software modernization application 114 may thus generate one or more test case definitions that, upon execution, emulate the requests sent by the client applications by including some or all of the same request parameters. The test case definitions further include information indicating an expected response to such requests (e.g., including expected response parameters or other information) so that it can be checked whether a containerization version of the application responds in a same manner. In some embodiments, the test cases 136 may be stored in a file (e.g., a JSON-formatted file) and described in a manner that enables a test case execution engine or test client application to execute the test cases against containerized versions of the application deployed at the cloud provider network 100 or other execution environment.

In some embodiments, in addition to the test cases described above generally testing the functionality of the containerized version of the application, the containerization tools 118 may further generate one or more non-functional tests used to test other aspects of the containerized application's deployment. Examples of non-functional tests include, but are not limited to, tests used to measure latency of the application when responding to requests or performing other actions, to test the application's ability to handle certain request loads or rates, to test the application's ability to scale, etc. In some embodiments, a baseline for the non-functional tests may be generated as part of the instrumentation processes described above (e.g., the non-containerized application's latency when responding to requests can be measured by the instrumentation tools and used as a point of comparison for the containerized version of the application, among other types of non-functional baseline measurements). In other embodiments, some or all of the non-functional tests may be standardized and applied to any type of containerized application without the need to use instrumentation data to generate the tests. The non-functional tests may be stored with the functional tests (e.g., in a same file describing the set of tests to be executed against the application) or stored separately from the functional tests.

In some embodiments, the software modernization application 114 enables users to modify and supplement the automatically generated test cases 136 as desired. For example, a user might modify or add test case definitions to match known business cases, to aggregate multiple requests into a same logical test case definition, to update the parameters used in a test case, to update a test case definition to ignore certain fields in responses when comparing to expected responses (e.g., to ignore a timestamp field, a transaction identifier field, or any other field that may vary with each response), and the like. In some embodiments, a user can use a third-party testing tool to modify the test cases or to add additional test case definitions for use during the containerization workflow. In some embodiments, once generated and optionally modified, the software modernization application 114 provides the test cases to an application modernization service 116, code deployment service 138, and/or other service of the cloud provider network 100 that will manage execution of the test case definitions during container deployment.

Figure 3:
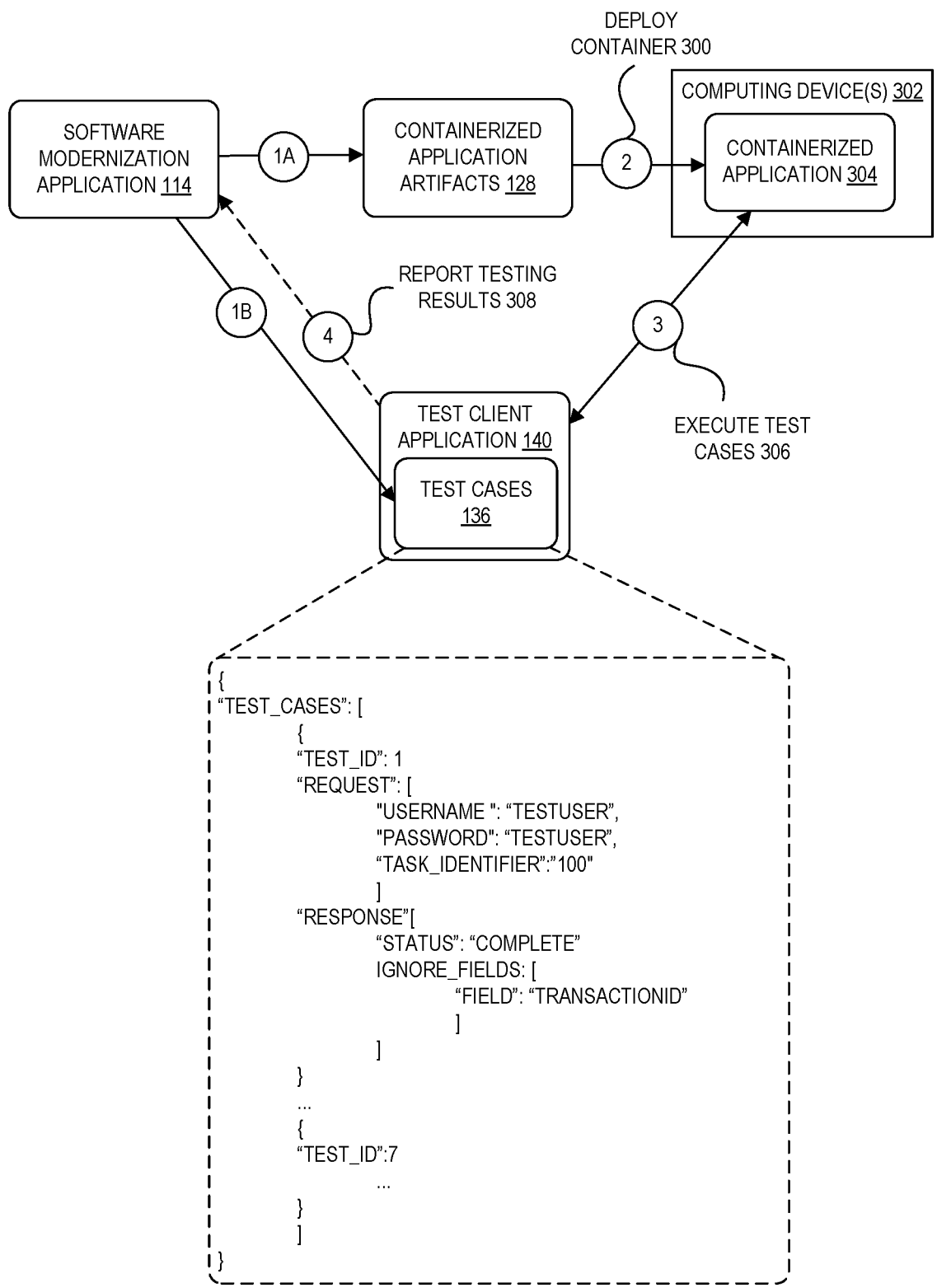
FIG. 3 is a diagram illustrating the execution of automatically generated test cases as part of a containerization and deployment workflow according to some embodiments.

FIG. 3 illustrates the execution of automatically generated test cases as part of a containerization and deployment workflow according to some embodiments. As shown, the software modernization application 114 generates, at circle "1A," the containerized application artifacts 128 and, at circle "1B, the test cases 136, as described above. In FIG. 3, an example file containing a description of the test cases 136 is shown; in other embodiments, the test cases may be represented using any other format and include any number of other field-value pairs or other information used by a test case execution engine or test client application to perform the described test cases. As indicated above, the test cases 136 can include basic tests, functional tests, non-functional tests, or any other types of tests or combinations thereof.

In some embodiments, at circle "2," the containerized application artifacts 128 are used to deploy 300 a container (e.g., based on the created container image and other configuration information), for example, using a container service 112 or other execution environment. In some embodiments, at circle "3," the software modernization application 114, code deployment service 138, or other service causes a test client application 140 to perform the test cases 136 against the deployed containerized application 304 running on computing device(s) 302. The test client application 140, for example, may itself be a container or other type of application that is launched and is configured to perform tests based on a test cases 136 file. In some embodiments, the test client application executes 306 the tests, e.g., by sending requests described by the test cases 136, receiving responses back from the containerized application 304, and comparing the responses to the expected responses described in the test cases 136 file. The test client application may also, for example, execute non-functional tests and monitor the performance of the containerized application 304 to ensure that the application satisfies one or more defined non-functional benchmarks. The test cases 136 may contain any number of separate test cases and the test client application 140 may store information indicating whether each test was successful or not upon receiving a response from the containerized application 304 (or if no response is received). In some embodiments, at circle "4," the test client application reports 308 the testing results back to the software modernization application 114, to a code deployment service 138, application modernization service 116, or any other destination that may use the test results to perform additional containerization workflow processes accordingly.

Returning to FIG. 1, in some embodiments, at circle "5," once the software modernization application 114 has created the containerized application artifacts 128 and test cases 136, the software modernization application 115 uses a code deployment service 138 to create a code deployment workflow used to deploy containers based on the containerized application artifacts 128 to one or more computing environments of the provider network 100. For example, the code deployment service 138 may provide an API that enables the software modernization application 114 to create a code deployment pipeline, to define stages of the code deployment pipeline, conditions for progressing from one stage of the pipeline to another, among other possible configurations. At a high level, in the example of FIG. 1, the software modernization application 114 may create a code deployment pipeline that first deploys a containerized version of the legacy software application 124 to a test or beta environment, performs the test cases to ensure expected operation of the application in the test environment, then deploys the containerized version of the legacy software application 124 to a production environment and again performs the test cases.

In particular, in the example shown in FIG. 1, the code deployment workflow is configured to first deploy, at circle "6A," the containerized application 142 to computing devices 144 associated with a test environment 146 (e.g., a "beta" environment setup by the user 102 for testing the containerized application before deploying to a production environment) and, at circle "6B," uses a test client application 140 to execute the generated test cases 136 to test the operation of the containerized application 142. Assuming the tests run against the containerized application 142 are successful in the test environment 146, the code deployment service 138 then deploys, at circle "7A," the containerized application 148 based on the containerized application artifacts 128 to the computing device(s) 150 of the production environment 152 and again, at circle "7B," uses the test client application 140 to execute the test cases 136 to test operation of the containerized application 148 in the production environment.

Figure 4:
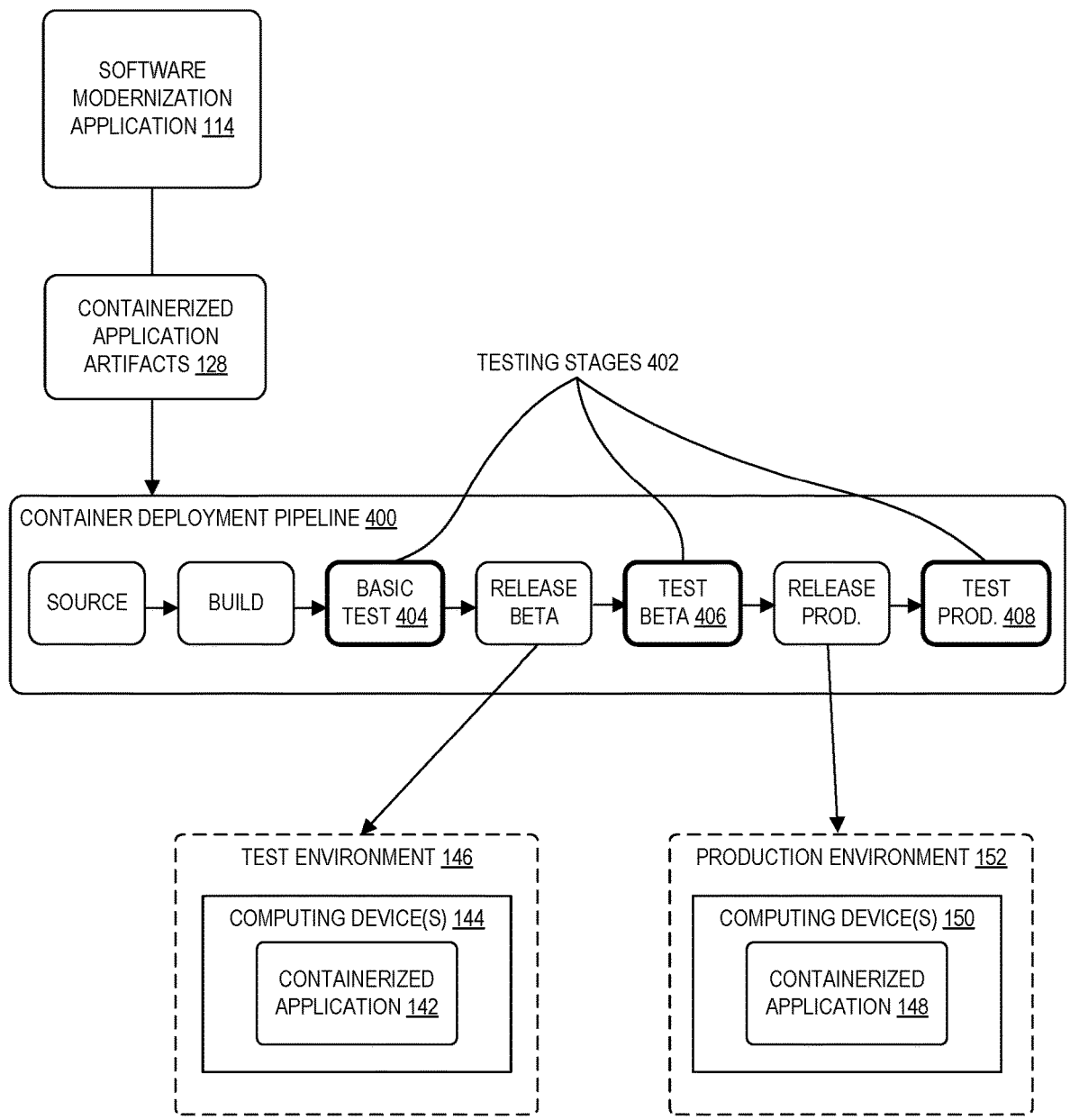
FIG. 4 is a diagram illustrating an example of a continuous integration and continuous delivery (CI/CD) pipeline managed by a code deployment service and including test stages for deployed containerized applications according to some embodiments.

In some embodiments, the deployment stages described above can be orchestrated by the code deployment service 138 such that little or no user interaction is necessary during the deployment process. FIG. 4 is a diagram illustrating an example of a continuous integration and continuous delivery (CI/CD) pipeline managed by a code deployment service and including test stages for deployed containerized applications according to some embodiments. In FIG. 3, the example pipeline 400 includes a series of stages (e.g., source, build, basic tests, release beta, test beta, release production, test production, etc.), which each serve as a logical division of the overall pipeline workflow.

Each stage in the pipeline 400 is comprised of a sequence of actions, which include tasks such as deploying the containerized application to a test environment, testing the operation of the deployed application, deploying the containerized application to a production environment, etc. For example, a build stage is associated with building the source code of the application and may optionally include the execution of one or more unit tests. Each of the unit tests, e.g., may test whether the operation of some component of the application's source (e.g., a method, a class, etc.) is fit for use. As indicated above, in some embodiments, a software modernization application 114 or software modernization service 116 can automatically create and configure a pipeline based on configuration information received from a software modernization application 114. In some embodiments, the testing stages 402, including a basic test 404 stage, a test beta 406 stage, and a test production 408 stage, each represent a stage in the pipeline where the generated test cases 136 and/or other related tests are automatically executed to ensure expected operation of the application as deployed at the cloud provider network 100. As indicated above, each of these test stages may include basic tests, functional tests, non-functional tests, or any combination thereof.

In some embodiments, containerization workflow described in reference to FIG. 1 can be reused upon a user making an update to the containerized application artifacts 128. For example, if the user 102 updates one or more containerization configurations, updates the application itself, or otherwise causes the containerized application artifacts 128 to be modified, in some embodiments, the software modernization application 114 automatically reperforms the containerization and deployment workflow described above—for example, the software modernization application 114 automatically regenerates the containerized application artifacts, optionally regenerates the test cases 136 (e.g., in scenarios where the application is updated and its operation is modified), and causes the container artifacts and test cases to be provided to a code deployment service 138 driven deployment workflow. In this manner, users are alleviated from manually generating and running test cases to test the operation of a containerized application during an initial containerization process and also for subsequent iterations of the containerization process.

Figure 5:
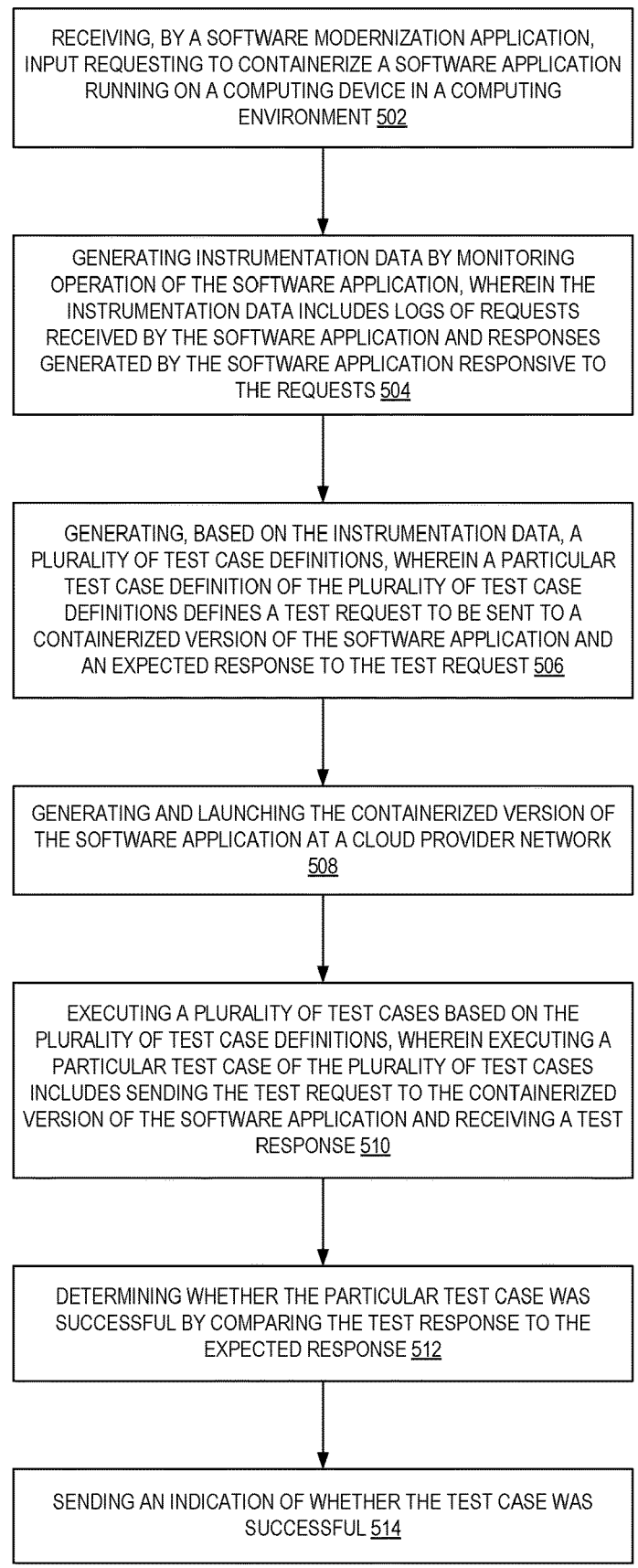
FIG. 5 is a flow diagram illustrating operations of a method for automatically generating and executing test cases as part of a containerization workflow according to some embodiments.

FIG. 5 is a flow diagram illustrating operations 500 of a method for automatically generating and executing test cases as part of a containerization workflow according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by a software modernization application 114 of the other figures.

The operations 500 include, at block 502, receiving, by a software modernization application, input requesting to containerize a software application running on a computing device in a computing environment.

The operations 500 further include, at block 504, generating instrumentation data by monitoring operation of the software application, wherein the instrumentation data includes logs of requests received by the software application and responses generated by the software application responsive to the requests.

The operations 500 further include, at block 506, generating, based on the instrumentation data, a plurality of test case definitions, wherein a particular test case definition of the plurality of test case definitions defines a test request to be sent to a containerized version of the software application and an expected response to the test request.

The operations 500 further include, at block 508, generating and launching the containerized version of the software application at a cloud provider network.

The operations 500 further include, at block 510, executing a plurality of test cases based on the plurality of test case definitions, wherein executing a particular test case of the plurality of test cases includes sending the test request to the containerized version of the software application and receiving a test response.

The operations 500 further include, at block 512, determining whether the particular test case was successful by comparing the test response to the expected response.

The operations 500 further include, at block 514, sending an indication of whether the test case was successful.

In some embodiments, the operations 500 further include generating, using a code deployment service of the cloud provider network, a container deployment workflow used to deploy the containerized version of the software application at a container service of the cloud provider network, wherein the deployment workflow includes at least one test stage that involves executing the plurality of test cases to test operation of the containerized version of the software application at the container service.

In some embodiments, the containerized version of the software application is launched based on container artifacts generated by the software modernization application, and the operations 500 further include: receiving input modifying a containerization configuration used by the software modernization application to generate the container artifacts; generating updated container artifacts based on the modified containerization configuration; launching an updated containerized version of the software application based on the updated container artifacts; and automatically executing the plurality of test cases against the updated containerized version of the software application.

In some embodiments, the operations 500 further include receiving, by the software modernization application, input identifying the software application to be containerized, wherein the software application is selected from an inventory of software applications identified by the software modernization application in a user computing environment.

In some embodiments, the operations further include generating, using a code deployment service of a cloud provider network, a deployment workflow used to deploy the containerized version of the software application at a container service of the cloud provider network, wherein the deployment workflow includes a first stage that involves deploying a first containerized version of the software application to a test environment and a second stage that involves deploying a second containerized version of the software application to a production environment, and wherein the deployment workflow progresses from the first stage to the second stage responsive to receiving an indication that the plurality of test cases were successful.

In some embodiments, the operations 500 further include generating, by the software modernization application, container artifacts associated with the software application to be containerized, wherein the container artifacts include a container image used to launch the containerized version of the software application, and wherein the software modernization application sends the container artifacts and the test case definitions to a service of a cloud provider network.

In some embodiments, the test case definitions include authentication credentials, and a test client application includes the authentication credentials with a request sent by the test client application to the containerized version of the software application.

In some embodiments, the instrumentation data is generated by a software agent installed on a computing device hosting the software application, and wherein the software agent interfaces with a virtual machine upon which the software application is executing to monitor the requests received by the software application and the responses generated by the software application responsive to the requests.

In some embodiments, the instrumentation data is generated by installing a copy of the software application in a sandbox environment, and wherein the software modernization application monitors test cases performed against the copy of the software application in the sandbox environment.

In some embodiments, the operations 500 further include receiving input modifying at least one of the plurality of test case definitions to obtain modified test case definitions, and wherein executing the plurality of test cases includes executing at least one test case based on the modified test case definitions.

In some embodiments, the operations further include receiving input specifying, for a particular test case definition associated with the particular test case, a field of an expected response associated with the particular test case definition to ignore; and wherein determining whether the particular test case was successful by comparing the test response to the expected response includes ignoring the field.

Figure 6:
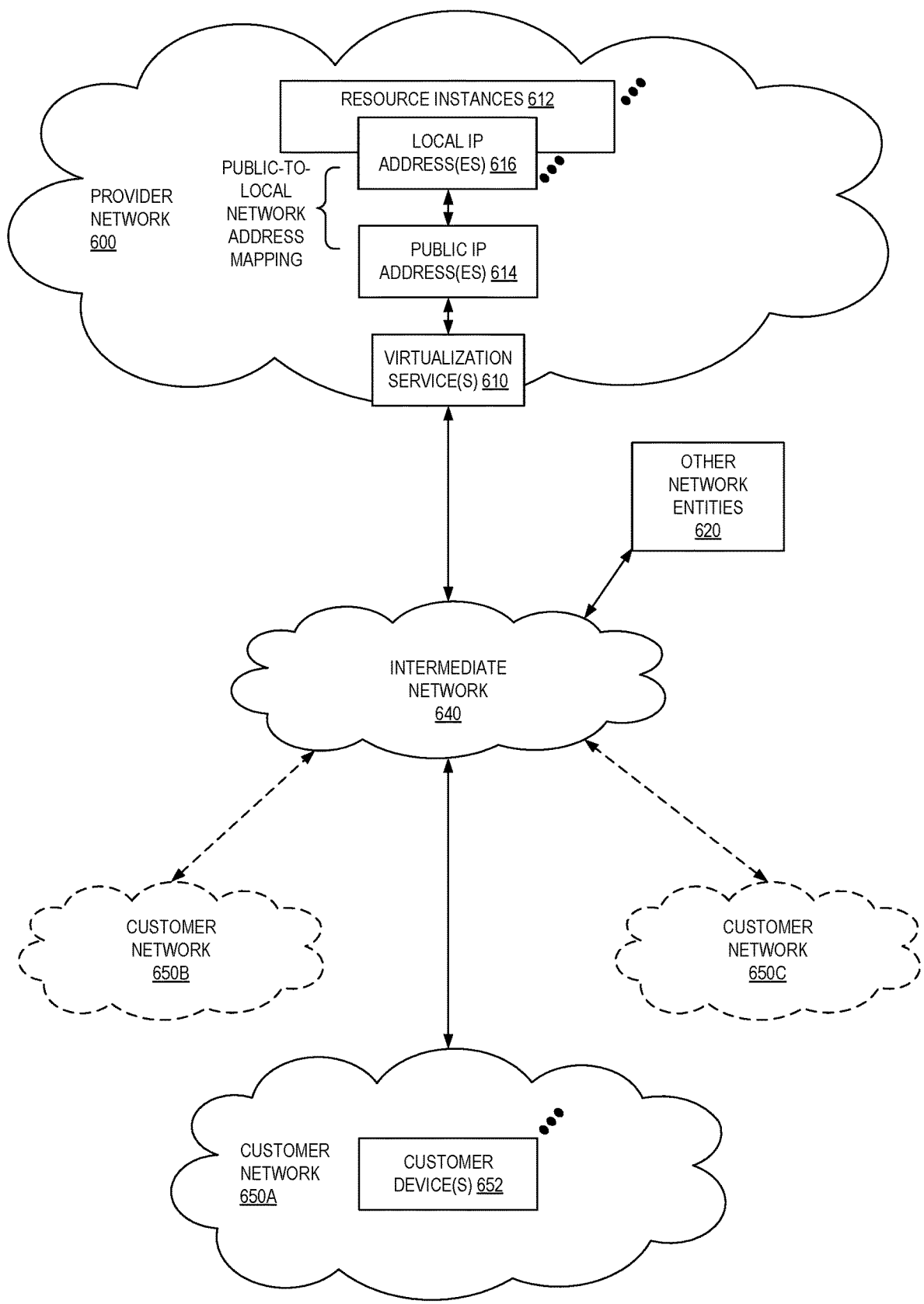
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
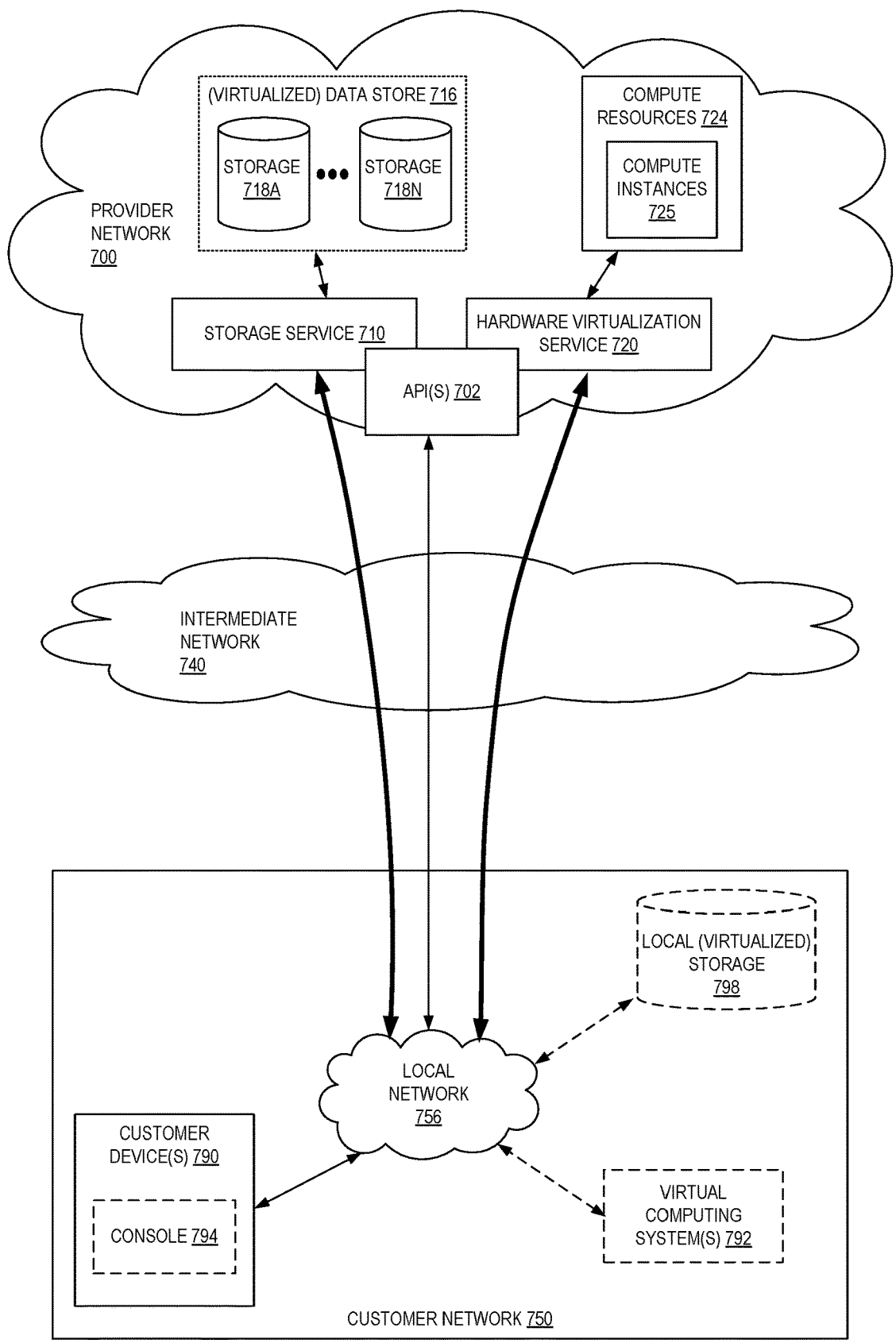
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple compute resources 724 (e.g., compute instances 725 such as VMs) to customers. The compute resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the compute resources 724 to public Internet destinations, and from public Internet sources to the local IP addresses of compute resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Figure 8:
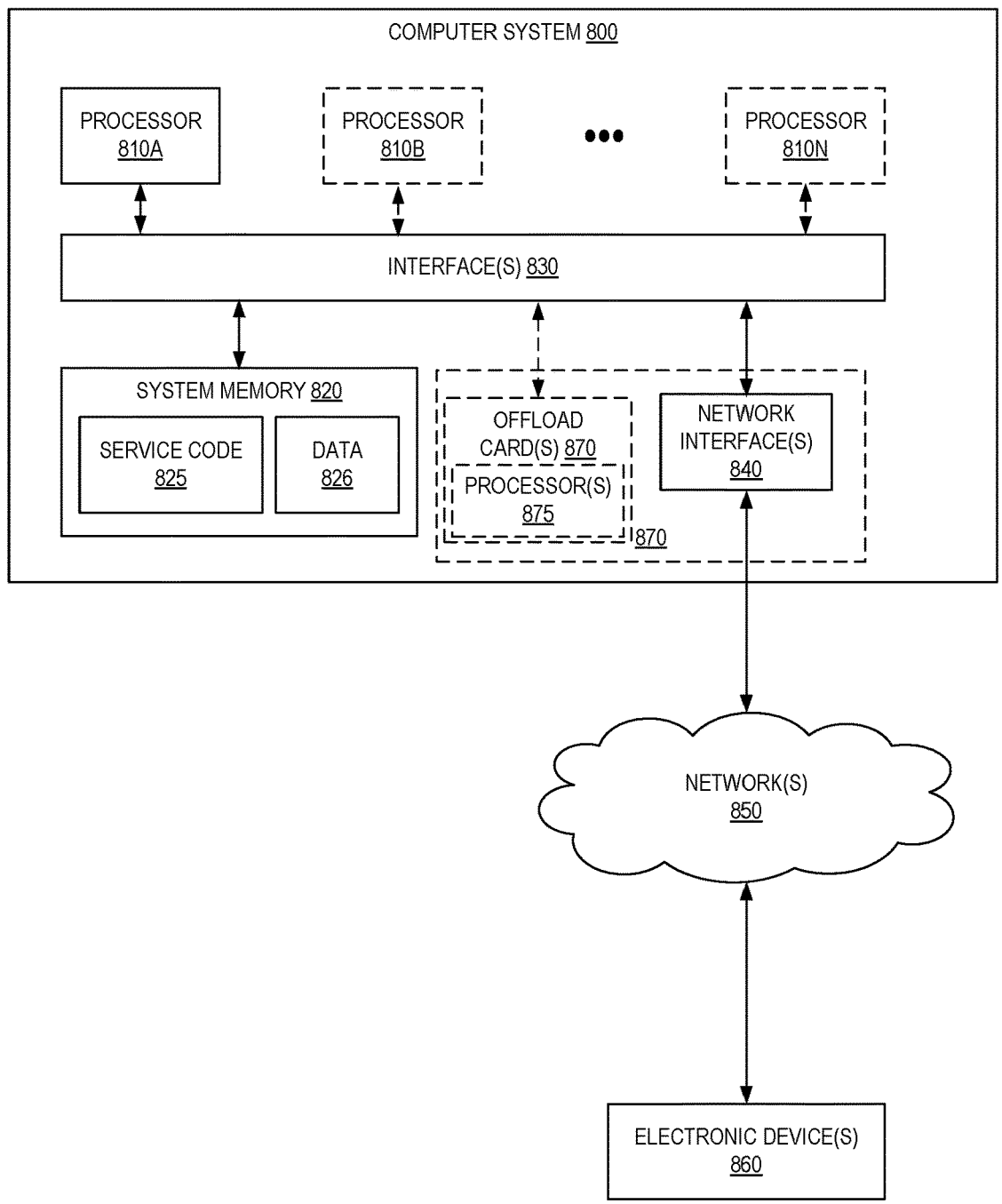
FIG. 8 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as service code 825 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute resources such as compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving, by a software modernization application, input requesting to containerize a software application running uncontainerized on a computing device in a production computing environment, wherein the software modernization application is implemented by one or more electronic devices;
   generating instrumentation data by monitoring operation of the software application running uncontainerized on the computing device in the production computing environment, wherein the instrumentation data includes logs of requests received by the software application running uncontainerized on the computing device in the production computing environment and responses generated by the software application running uncontainerized on the computing device in the production computing environment responsive to the requests;
   generating, based on the instrumentation data, a plurality of test case definitions, wherein a particular test case definition of the plurality of test case definitions defines a test request to be sent to a containerized version of the software application and an expected response to the test request;
   generating and launching a first containerized version of the software application in a test environment at a cloud provider network;
   executing a plurality of test cases based on the plurality of test case definitions, wherein executing a particular test case of the plurality of test cases includes sending the test request to the first containerized version of the software application in the test environment at the cloud provider network and receiving a test response from the first containerized version of the software application in the test environment at the cloud provider network;
   determining whether the particular test case was successful by comparing the test response to the expected response;
   based at least in part on determining that the particular test case was successful, deploying a second containerized version of the software application to the production computing environment at the cloud provider network; and
   executing the plurality of test cases against the second containerized version of the software application in the production computing environment.

2. The computer-implemented method of claim 1, further comprising generating, using a code deployment service of the cloud provider network, a container deployment workflow used to deploy the first containerized version of the software application at a container service of the cloud provider network, wherein the container deployment workflow includes at least one test stage that involves executing the plurality of test cases to test operation of the first containerized version of the software application at the container service.

3. The computer-implemented method of claim 1, wherein the first containerized version of the software application is launched based on container artifacts generated by the software modernization application, and wherein the computer-implemented method further comprises:
   receiving input modifying a containerization configuration used by the software modernization application to generate the container artifacts;
   generating updated container artifacts based on the modified containerization configuration;
   launching an updated containerized version of the software application based on the updated container artifacts; and
   automatically executing the plurality of test cases against the updated containerized version of the software application.

4. A computer-implemented method comprising:
   generating, by a software modernization application, instrumentation data by monitoring operation of a software application to be containerized running uncontainerized on a computing device in a production computing environment, wherein the instrumentation data includes logs of requests received by the software application to be containerized running uncontainerized on the computing device in the production computing environment and responses generated by the software application to be containerized running uncontainerized on the computing device in the production computing environment responsive to the requests, wherein the software modernization application is implemented by one or more electronic devices;

generating, based on the instrumentation data, a plurality of test case definitions;

executing a plurality of test cases based on the plurality of test case definitions, wherein executing a particular test case of the plurality of test cases includes sending a test request to a first containerized version of the software application in a test computing environment and receiving a test response;

determining whether the particular test case was successful by comparing the test response to an expected response;

sending an indication of whether the particular test case was successful;

based at least in part on determining that the particular test case was successful, deploying a second containerized version of the software application to the production computing environment; and executing the plurality of test cases against the second containerized version of the software application in the production environment.

5. The computer-implemented method of claim 4, further comprising generating, using a code deployment service of a cloud provider network, a container deployment workflow used to deploy the first containerized version of the software application at a container service of the cloud provider network, wherein the container deployment workflow includes at least one test stage that involves executing the plurality of test cases to test operation of the first containerized version of the software application at the container service.

6. The computer-implemented method of claim 4, wherein the first containerized version of the software application is launched based on container artifacts generated by the software modernization application, and wherein the computer-implemented method further comprises:

receiving input modifying a containerization configuration used by the software modernization application to generate the container artifacts;

generating updated container artifacts based on the modified containerization configuration;

launching an updated containerized version of the software application based on the updated container artifacts; and automatically executing the plurality of test cases against the updated containerized version of the software application.

7. The computer-implemented method of claim 4, further comprising receiving, by the software modernization application, input identifying the software application to be containerized running uncontainerized on the computing device in the production computing environment, wherein the software application is selected from an inventory of software applications identified by the software modernization application in a user computing environment.

8. The computer-implemented method of claim 4, further comprising generating, using a code deployment service of a cloud provider network, a deployment workflow used to deploy the first containerized version of the software application at a container service of the cloud provider network, wherein the deployment workflow includes a first stage that involves deploying the first containerized version of the software application to the test computing environment and a second stage that involves deploying the second containerized version of the software application to the production computing environment, and wherein the deployment workflow progresses from the first stage to the second stage responsive to receiving an indication that the plurality of test cases were successful.

9. The computer-implemented method of claim 4, further comprising generating, by the software modernization application, container artifacts associated with the software application to be containerized running uncontainerized on the computing device in the test computing environment, wherein the container artifacts include a container image used to launch the first containerized version of the software application, and wherein the software modernization application sends the container artifacts and the plurality of test case definitions to a service of a cloud provider network.

10. The computer-implemented method of claim 4, wherein the plurality of test case definitions include authentication credentials, and wherein a test client application includes the authentication credentials with a request sent by the test client application to the first containerized version of the software application.

11. The computer-implemented method of claim 4, wherein the instrumentation data is generated by a software agent installed on a computing device hosting the software application to be containerized running uncontainerized on the computing device in the test computing environment, and wherein the software agent interfaces with a virtualized execution environment upon which the software application to be containerized running uncontainerized on the computing device in the test computing environment is executing to monitor the requests received by the software application to be containerized running uncontainerized on the computing device in the test computing environment and the responses generated by the software application to be containerized running uncontainerized on the computing device in the test computing environment responsive to the requests.

12. The computer-implemented method of claim 4, wherein the instrumentation data is generated by installing a copy of a particular software application in a sandbox environment, and wherein the software modernization application monitors test cases performed against the copy of the particular software application in the sandbox environment.

13. The computer-implemented method of claim 4, further comprising receiving input modifying at least one of the plurality of test case definitions to obtain modified test case definitions, and wherein executing the plurality of test cases includes executing at least one test case based on the modified test case definitions.

14. The computer-implemented method of claim 4, further comprising:

receiving input specifying, for a particular test case definition associated with the particular test case, a field of an expected response associated with the particular test case definition to ignore; and wherein determining whether the particular test case was successful by comparing the test response to the expected response includes ignoring the field.

15. The computer-implemented method of claim 4, wherein the plurality of test cases represent a plurality of functional tests, and wherein the computer-implemented method further comprises:

generating at least one non-functional test used to test a non-functional aspect of the first containerized version of the software application, wherein the non-functional aspect of the first containerized version of the software application relates to at least one of: latency of the first containerized version of the software application responding to requests, an ability for the first containerized version of the software application to handle a request load, an ability for the first containerized version of the software application to scale; and executing the at least one non-functional test against the first containerized version of the software application.

16. A system comprising:

a first one or more electronic devices implementing a software modernization application, wherein the software modernization application includes first instructions that upon execution cause the software modernization application to:

receive input requesting to containerize a software application running uncontainerized on a computing device in a production computing environment;

generate instrumentation data by monitoring operation of the software application running uncontainerized on the computing device in the production computing environment, wherein the instrumentation data includes logs of requests received by the software application running uncontainerized on the computing device in the production computing environment and responses generated by the software application running uncontainerized on the computing device in the production computing environment responsive to the requests; and generate, based on the instrumentation data, a plurality of test case definitions, wherein a particular test case definition of the plurality of test case definitions defines a test request to be sent to a containerized version of the software application and an expected response to the test request; and a second one or more electronic devices implementing a code deployment service of a cloud provider network, wherein the code deployment service includes second instructions that upon execution cause the code deployment service to:

launch a first containerized version of the software application at a cloud provider network using container artifacts generated by the software modernization application;

cause execution of a plurality of test cases based on the plurality of test case definitions, wherein executing a particular test case of the plurality of test cases includes sending the test request to the first containerized version of the software application in a test computing environment and receiving a test response, determine whether the particular test case was successful by comparing the test response to the expected response;

based at least in part on determining that the particular test case was successful, deploying a second containerized version of the software application to the production computing environment; and executing the plurality of test cases against the second containerized version of the software application in the production computing environment.

17. The system of claim 16, wherein the second instructions, upon execution, further cause the code deployment service to execute a container deployment workflow used to deploy the first containerized version of the software application at a container service of the cloud provider network, wherein the container deployment workflow includes at least one test stage that involves executing the plurality of test cases to test operation of the first containerized version of the software application at the container service.

18. The system of claim 16, wherein the first containerized version of the software application is launched based on container artifacts generated by the software modernization application, and wherein the first instructions, upon execution, further cause the software modernization application to:

receive input modifying a containerization configuration used by the software modernization application to generate the container artifacts;

generate updated container artifacts based on the modified containerization configuration;

launch an updated containerized version of the software application based on the updated container artifacts; and automatically execute the plurality of test cases against the updated containerized version of the software application.

19. The system of claim 16, wherein the first instructions, upon execution, further cause the software modernization application to receive, by the software modernization application, input identifying the software application to be containerized running uncontainerized on the computing device in the test computing environment, wherein the software application is selected from an inventory of software applications identified by the software modernization application in a user computing environment.

20. The system of claim 16, wherein the first instructions, upon execution, further cause the software modernization application to generate, using the code deployment service of a cloud provider network, a deployment workflow used to deploy the first containerized version of the software application at a container service of the cloud provider network, wherein the deployment workflow includes a first stage that involves deploying the first containerized version of the software application to the test computing environment and a second stage that involves deploying the second containerized version of the software application to the production computing environment, and wherein the deployment workflow progresses from the first stage to the second stage responsive to receiving an indication that the plurality of test cases were successful.

\* \* \* \* \*